United States Patent
Abiru et al.

[11] Patent Number: 5,915,676
[45] Date of Patent: Jun. 29, 1999

[54] LEVER-TYPE FRICTIONAL RESISTANCE FORCE VARIABLE SYSTEM

[75] Inventors: Hisanori Abiru; Hideaki Harada; Jun Hirai; Kenji Imada; Souhei Tateyama, all of Hiroshima, Japan

[73] Assignee: Mitsubishi Jukogyo Kabushiki Kaisha, Tokyo, Japan

[21] Appl. No.: 08/796,817

[22] Filed: Feb. 6, 1997

[30] Foreign Application Priority Data

Mar. 22, 1996 [JP] Japan .................................. 8-066326

[51] Int. Cl.⁶ ............................................. E04H 9/02
[52] U.S. Cl. ..................... 267/136; 248/550; 52/167.1; 52/167.3; 188/134
[58] Field of Search ................. 188/71.1, 71.4, 188/71.5, 112, 129, 134, 378–381; 267/136; 248/550; 52/167.1, 167.3, 167.6

[56] References Cited

U.S. PATENT DOCUMENTS

| | | | |
|---|---|---|---|
| 2,764,260 | 9/1956 | Fleischman | 188/381 |
| 4,265,467 | 5/1981 | Aleck | 188/381 |
| 4,371,141 | 2/1983 | Baratoff | 248/569 |
| 4,513,846 | 4/1985 | Yajima | 188/380 |
| 4,763,869 | 8/1988 | Nakamura et al. | 248/562 |
| 4,941,640 | 7/1990 | Nakamura et al. | 248/562 |
| 5,303,524 | 4/1994 | Caspe | 52/167.1 |
| 5,727,663 | 3/1998 | Tayla | 188/378 |
| 5,775,469 | 7/1998 | Kang | 188/267 |

FOREIGN PATENT DOCUMENTS

| | | | |
|---|---|---|---|
| 0009327 | 1/1984 | Japan | 267/136 |
| 2-101269 | 4/1990 | Japan . | |
| 6-78540 | 11/1994 | Japan . | |
| 1293400 | 2/1987 | U.S.S.R. | 188/381 |

*Primary Examiner*—Chris Schwartz
*Attorney, Agent, or Firm*—Nixon & Vanderhye PC

[57] ABSTRACT

The present invention provides a lever-type frictional resistance force variable system comprising an arm whose upper end is rotatably supported by an upper beam; a supporting member which is fixed to a lower beam to rotatably support the intermediate portion of the arm; a braking device having frictional resistance plates connected to the lower end side of the arm, frictional pads provided between the frictional resistance plates, a pressing pad, and a screw rod; a turning lever connected to the screw rod; a ball screw threadedly engaging with the turning lever; a servomotor for rotating the ball screw; a displacement sensor for detecting a displacement of a frame; and a control unit for determining a braking force to be generated by the braking device based on the detected value of the displacement sensor and outputting a control signal according to the determined braking force.

8 Claims, 5 Drawing Sheets

F I G. 2
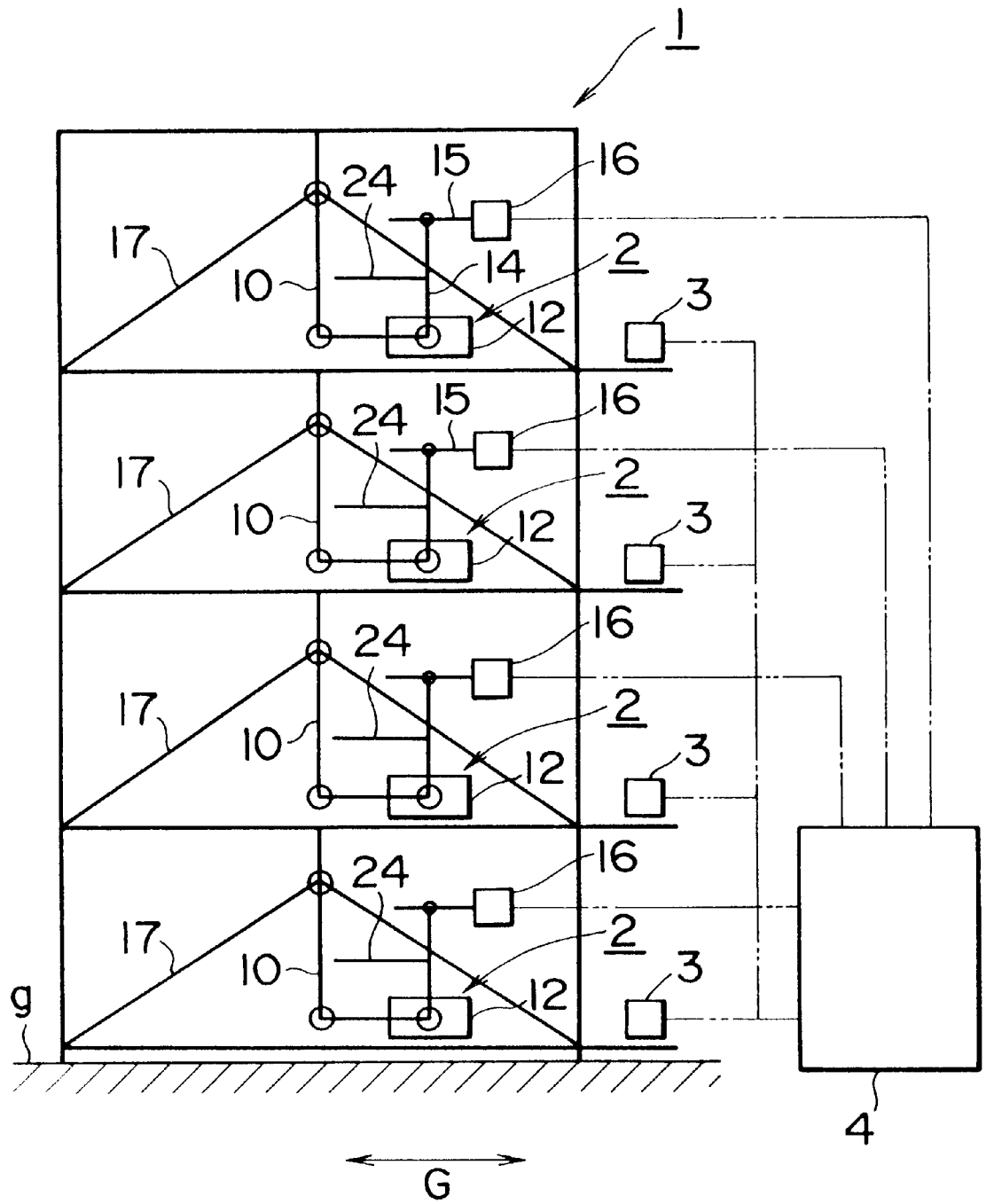

LEVER-TYPE FRICTIONAL RESISTANCE FORCE VARIABLE SYSTEM

FIELD OF THE INVENTION AND RELATED ART STATEMENT

The present invention relates to a lever-type frictional resistance force variable system which controls an absorbed amount of vibration energy by changing a resistance force necessary for damping of a structure.

As shown in FIG. 6, when an external force G generated by an earthquake etc. acts on a high structure (for example, a multistoried building or high smokestack) 1 via the ground g, the structure 1 is vibrated. The vibration displacement x is amplified at a higher position, causing damage to the structure 1. For this reason, the recent structure 1 is provided with various types of damping systems as described below.

Passive damping system

A damper for absorbing vibration energy by plasticization is incorporated at an appropriate place in the structure 1, so that the vibration of the structure 1 is damped by absorbing vibration energy by the use of this damper.

An example of active damping system

An actuator is incorporated at an appropriate place in the structure 1, so that the vibration of the structure 1 is damped by applying a force equivalent to the vibration energy to the structure 1 by the use of this actuator.

Another example of active damping system

A structural member such as a brace is detachably installed or removed at an appropriate place in the structure 1 in accordance with the vibration wave to change the rigidity of the structure 1, by which resonance is avoided.

However, the above-described conventional damping systems present the problems described below.

In the passive damping system in the above item (1), though the system is relatively effective against a large earthquake, the stroke of the system is limited, and the system does not operate against a medium or small earthquake in some cases.

In the active damping system in the above item (2), though the damping effect against an earthquake is large, a large size actuator must be used, and it is difficult to get power for the actuator when electric power fails.

In the active damping system in the above item (3), though the damping effect is large when a particular vibration wave is predominant, the damping effect is small against an earthquake in which various vibration waves acts mixedly.

OBJECT AND SUMMARY OF THE INVENTION

Accordingly, the present invention was made in view of the above-described prior art, and an object thereof is to provide a lever-type frictional resistance force variable system which can effectively restrain the vibration of a structure even when an external force ranging from a large external force produced by a large earthquake etc. to a medium and small external force produced by a medium or small earthquake etc. is applied to the structure, or even when an external force of earthquake etc. in which various vibration waves are mixed is applied to the structure.

To achieve the above object, the lever-type frictional resistance force variable system of a first invention comprises:

an arm whose one end is rotatably supported by one of at least two frames moving relatively when a structure is vibrated by an external force of earthquake etc.;

a supporting member which is fixed to the other of the two frames moving relatively and rotatably supports the intermediate portion of the arm;

a braking device having frictional resistance plates connected to the other end of the arm in such a manner as to be capable of moving with the turning of the other end of the arm, friction pads provided along the frictional resistance plates, and a pressing portion provided in association with the frictional resistance plates and friction pads, said pressing portion pressing the friction pads and frictional resistance plates to generate a braking force;

a turning lever whose one end is connected to the pressing portion of the braking device to operate the pressing portion by turning; and driving means for turning the turning lever by driving the other end of the turning lever.

Also, the lever-type frictional resistance force variable system of a second invention is characterized in that in the above-described first invention, the system has a sensor for detecting a displacement of the frame and a control unit for determining a braking force to be generated by the braking device based on the detected value of the sensor and outputting a control signal according to the determined braking force, the driving means has a ball screw threadedly engaging with the turning lever and a servomotor for rotating the ball screw, and the braking force generated by the braking device is adjusted by rotating the servomotor a predetermined amount to turn the turning lever a predetermined amount based on the control signal outputted from the control unit.

Therefore, according to the lever-type frictional resistance force variable system of the above first invention, when the structure is vibrated by an external force of an earthquake etc., the frames constituting the structure move relatively, so that the arm whose one end is rotatably supported by one of the frames moving relatively turns around a turning support point of the supporting member fixed to the other of the frames moving relatively. As a result, the frictional resistance plates move with the turning of the other end of the arm. To inhibit this movement, the pressing portion presses the friction pads and frictional resistance plates by turning the turning lever by the use of the driving means. Thus, a large frictional force acts on the contact surfaces between the friction pads and the frictional resistance plates to generate a braking force, so that the movement of the frictional resistance plates is restrained, by which the vibration of the structure is damped.

Also, according to the lever-type frictional resistance force variable system of the above second invention, when a displacement of the frame is detected by the sensor, the control unit determines a braking force to be generated by the braking device based on the detected value of the sensor, and outputs a control signal according to the determined braking force. The servomotor rotates the ball screw a predetermined amount based on the control signal. As a result, the turning lever threadedly engaging with the ball screw is turned a predetermined amount to generate a predetermined braking force in the braking device, so that the movement of the frictional resistance plates is restrained by this braking force, by which the vibration of the structure is damped.

As described above, according to the lever-type frictional resistance force variable system of the present invention, the vibration of the structure can be restrained effectively even when an external force ranging from a large external force produced by a large earthquake etc. to a medium and small external force produced by a medium or small earthquake etc. is applied to the structure, or even when an external force of earthquake etc. in which various vibration waves are mixed is applied to the structure.

Moreover, since a braking force is generated by the lever-type frictional resistance force variable system, this system can be operated by less power, so that an uninterruptible power supply unit for operating this system in case of power failure can have a low capacity.

Also, since the system, comprising the sensor, control unit, servomotor, etc., is so configured that the braking force generated in the braking device based on the detection signal (i.e. displacement of frame) of the sensor is adjusted, the optimum frictional resistance force can be adjusted in a stepless manner according to the displacement of frame, resulting in good control response.

BRIEF DESCRIPTION OF THE DRAWINGS

FIG. 2 is a view showing a configuration of the lever-type frictional resistance force variable systems disposed on every story of a structure and a control unit therefor;

DETAILED DESCRIPTION OF PREFERRED EMBODIMENTS

Figure 6:
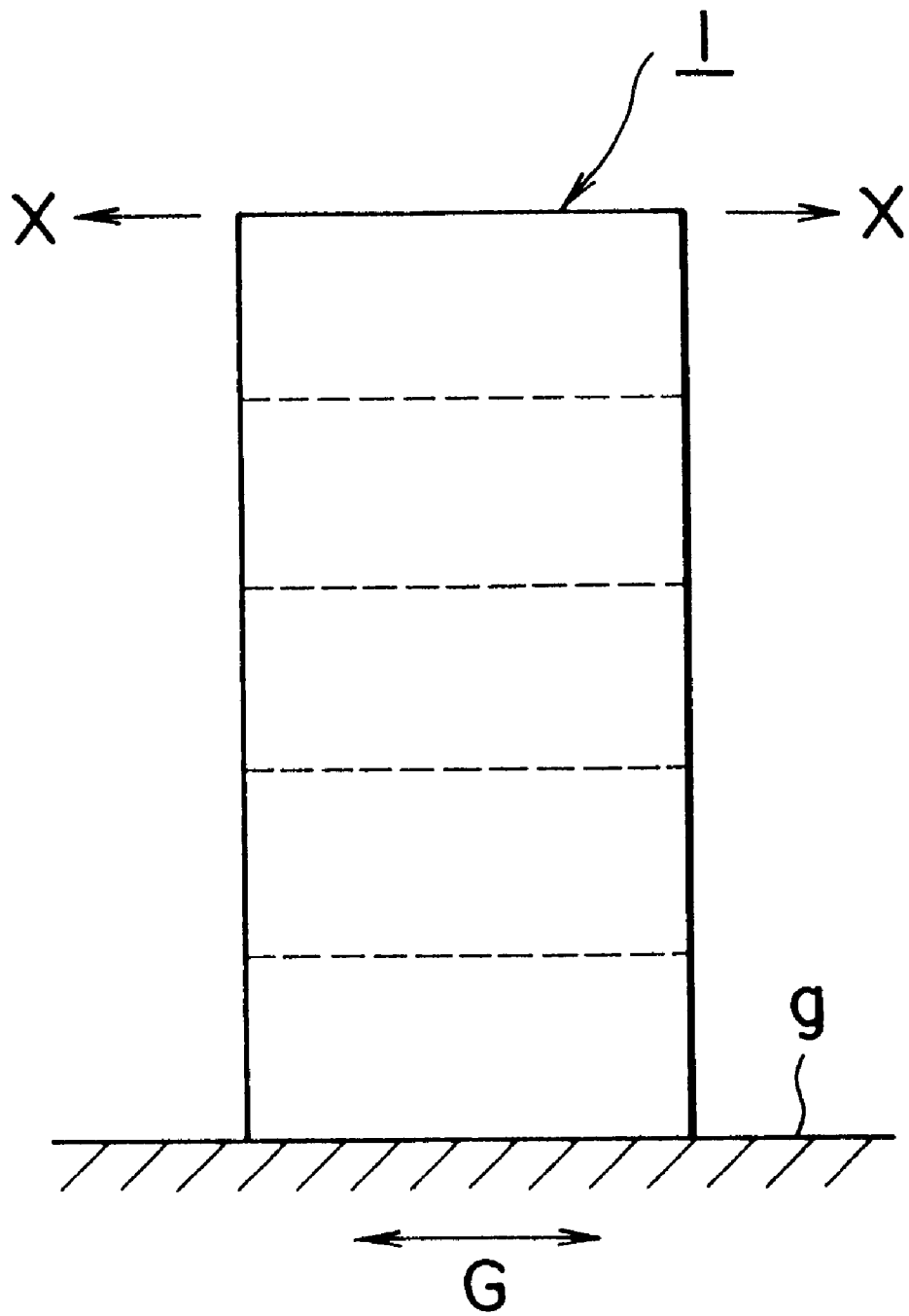
FIG. 6 is a view for illustrating a vibration displacement produced in a structure.

An embodiment of the present invention will be described in detail below with reference to the drawings. The same reference characters are applied to the elements which are essentially the same as those in FIG. 6, and duplicate explanation is omitted.

Figure 1:
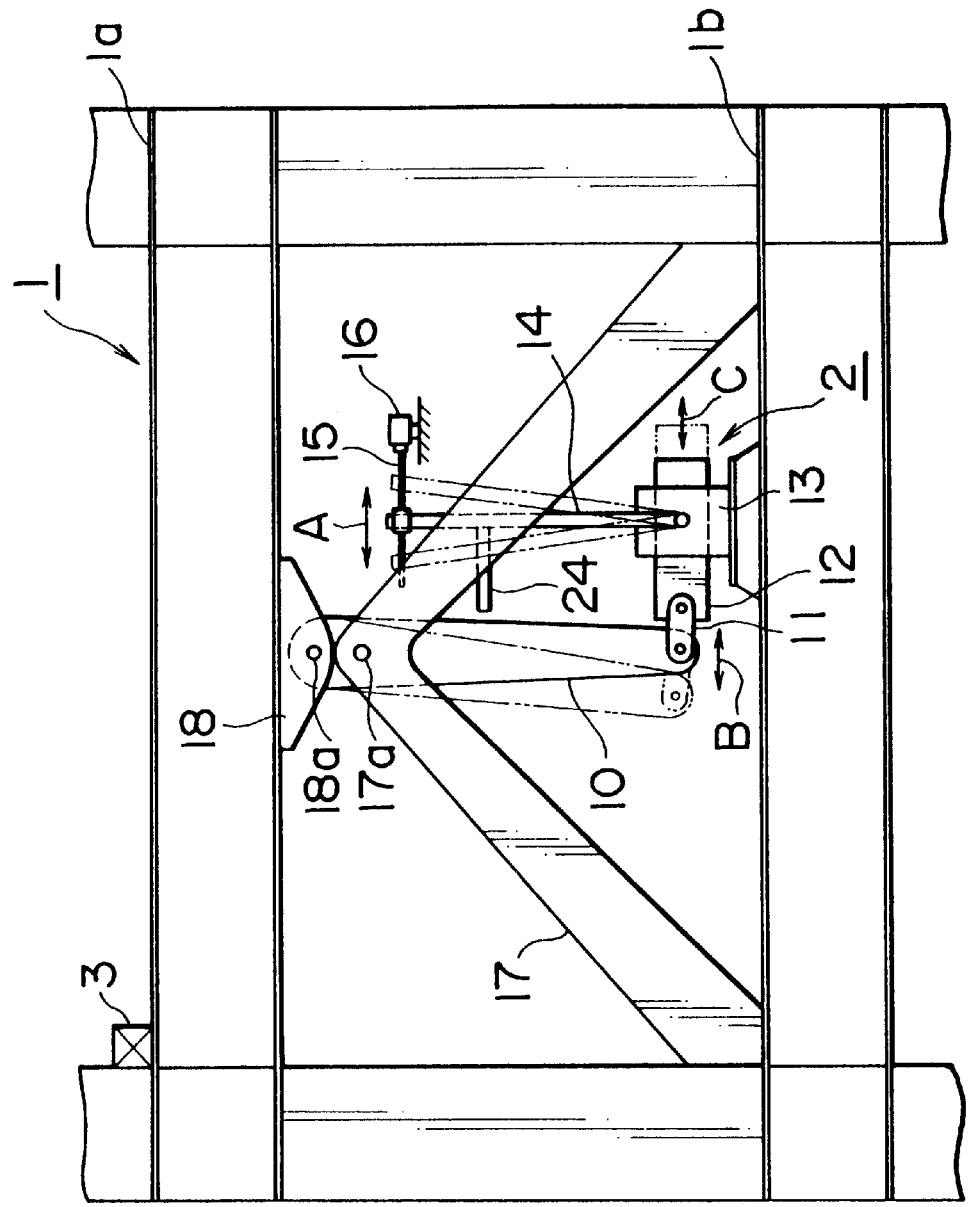
FIG. 1 is a schematic view showing a configuration of a lever-type frictional resistance force variable system in accordance with an embodiment of the present invention.
Figure 3:
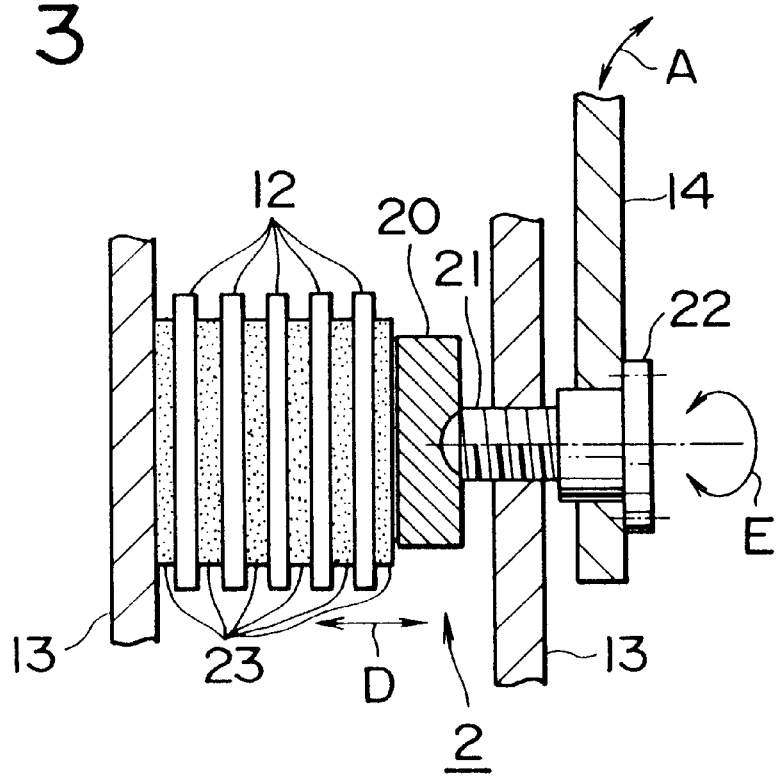
FIG. 3 is an enlarged sectional view of a principal portion of a braking device provided in the lever-type frictional resistance force variable system.
Figure 4:
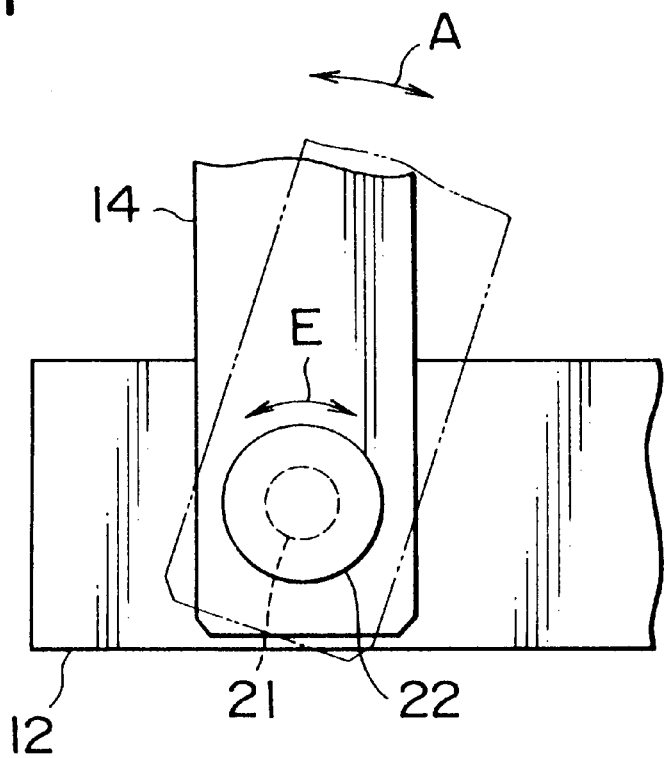
FIG. 4 is a side view of the braking device, shown by being omitted partly.

FIG. 1 is a schematic view showing a configuration of a lever-type frictional resistance force variable system in accordance with an embodiment of the present invention, FIG. 2 is a view showing a configuration of the lever-type frictional resistance force variable systems disposed on every story of a structure and a control system therefor, FIG. 3 is an enlarged sectional view of a principal portion of a braking device provided in the lever-type frictional resistance force variable system, and FIG. 4 is a side view of the braking device, shown by being omitted partly.

As shown in FIG. 1, a lever-type frictional resistance force variable system in accordance with this embodiment is disposed in a frame space between an upper beam 1a and a lower beam 1b, which constitute a structure 1. In FIG. 2, the lever-type frictional resistance force variable system of this embodiment is disposed at an appropriate place on every story of the structure 1.

Referring to FIG. 1, the lever-type frictional resistance force variable system of this embodiment has an arm 10, and the upper end of this arm 10 is rotatably supported, via a pin 18a, by a bracket 18 fixed to the upper beam 1a. The lower end (free end) of the arm 10 is connected to a plurality of frictional resistance plates 12 of a braking device 2 via a connection arm 11 of link mechanism. Further, the upper-side intermediate portion of the arm 10 is rotatably supported by the upper part of a supporting member (brace) 17 via a pin 17a, and the lower part of the supporting member 17 is fixed near the lower beam 1b.

The frictional resistance plates 12 are supported by a support frame 13 of the braking device 2 provided on the lower beam 1b side in such a manner as to be movable in the transverse direction in the figure (see arrow C).

As shown in FIGS. 3 and 4, in the support frame 13 of the braking device 2 are provided a plurality of frictional resistance plates 12, friction pads 23 disposed between these frictional resistance plates 12 and at both ends, and a pressing pad 20 which is provided in association with the friction pads 23 and the frictional resistance plates 12 to produce a braking force so that a large frictional force acts on contact surfaces between them by pressing the friction pads 23 and the frictional resistance plates 12 from the side. Moreover, the braking device 2 has a screw rod 21 for moving the pressing pad 20 in the pressing and releasing directions, and is configured so that the screw rod 21 passes through one side of the support frames 13. To the right end of the screw rod 21 in FIG. 3, the lower end of a turning lever 14 is attached via a boss 22.

As shown in FIG. 1, a ball screw 15 is threadedly engaged with the upper end (free end) of the turning lever 14, and the base end (right end in the figure) of the ball screw 15 is connected to a rotating shaft of a servomotor 16. Therefore, when the servomotor 16 rotates the ball screw 15 in one direction or the other direction, the turning lever 14 is turned in the transverse direction in the figure (see arrow A). Thereupon, as shown in FIG. 3, the screw rod 21, which turns (see arrow E) together with the turning lever 14, moves the pressing pad 20 in the transverse direction (see arrow D). Whereby, the friction pads 23 and the frictional resistance plates 12 are pressed or released. Specifically, when the turning lever 14 is turned to the right in FIG. 1, the frictional resistance plates 12 etc. are pressed via the pressing pad 20. Inversely, when the turning lever 14 is turned to the left in FIG. 1, the frictional resistance plates 12 etc. are released.

As shown in FIG. 1, an exciting lever 24 is provided at the intermediate portion of the turning lever 14 so as to protrude toward the arm 10. The tip end of the exciting lever 24 is pressed against the arm 10 to excite vibration on the structure 1 by turning the turning lever 14 in the direction in which the frictional resistance plates 12 etc. are released (left direction in the figure).

Also, as shown in FIGS. 1 and 2, a displacement sensor 3 is provided on the frame of the structure 1. The displacement sensor 3, which is provided on every story, detects the displacement of each frame and outputs the detection signal to a control unit 4.

The control unit 4 determines a braking force to be generated by the braking device 2 based on the detection signal outputted from the displacement sensor 3, and outputs a control signal to the servomotor 16 according to the determined braking force. Based on this control signal, the servomotor 16 rotates a predetermined amount to turn the turning lever 14 a predetermined amount, by which the braking force generated by the braking device 2 is adjusted.

Therefore, according to the lever-type frictional resistance force variable system of the above configuration, if the structure 1 is vibrated by an external force G produced by an earthquake etc., the upper beam 1a and the lower beam 1b, which constitute the structure 1, move relatively, and the arm 10, whose upper end is rotatably supported by the bracket 18 on the upper beam 1a, is turned around the support point (pin 17a) of the supporting member 17, by which the lower end of the arm 10 moves in the transverse direction in FIG. 1 (see arrow B).

As a result, the frictional resistance plates 12 move in the transverse direction in FIG. 1 with the movement of the lower end of the arm 10. At this time, the servomotor 16 rotates in one direction to turn the turning lever 14 to the right in FIG. 1, so that a pressing force is applied to the frictional resistance plates 12 and the friction pads 23 via the pressing pad 20. Whereby, a large frictional force acts on the contact surfaces between the frictional resistance plates 12 and the friction pads 23 to generate a braking force, so that the movement of the frictional resistance plates 12 is inhibited, and therefore the vibration of the structure 1 is damped.

At this time, the displacement sensor 3 detects the displacement of the frame of the structure 1. The control unit 4 determines the braking force to be generated by the braking device 2 based on the current detected value of the displacement sensor 3, and outputs a control signal to the servomotor 16 according to this braking force. Based on this control signal, the servomotor 16 rotates a predetermined amount to turn the turning lever 14 a predetermined amount. Thus, the braking device 2 generates the optimum braking force in accordance with the current displacement of the frame.

As described above, according to the lever-type frictional resistance force variable system of this embodiment, the system is so configured that the braking device 2 for generating a frictional braking force is connected to the link mechanism connected by using a lever consisting of the supporting member 17 and the arm 10, and a frictional braking force is generated in the braking device 2 by driving the turning lever 14 with the combination of the servomotor 16 and the ball screw 15, so that the vibration of the structure 1 can be restrained effectively even when an external force ranging from a large external force produced by a large earthquake etc. to a medium and small external force produced by a medium or small earthquake etc. is applied to the structure 1, or even when an external force of earthquake etc. in which various vibration waves are mixed is applied to the structure 1. Moreover, since a braking force is generated by the lever-type frictional resistance force variable system as described above, this system can be operated by less power, so that an uninterruptible power supply unit for operating this system in case of power failure can have a low capacity.

Also, since the system, comprising the displacement sensor 3, control unit 4, servomotor 16, etc., is so configured that the braking force generated in the braking device 2 based on the detection signal (i.e. displacement of frame) of the displacement sensor 3 is adjusted, the optimum frictional resistance force can be adjusted in a stepless manner according to the displacement of frame, resulting in good control response.

Further, since the system is so configured that the exciting lever 24 is pressed against the arm 10 to arbitrarily excite vibration on the structure 1 by turning the turning lever 14 in the direction in which the frictional resistance plates 12 etc. are released, the operation of the system can be checked.

Figure 5:
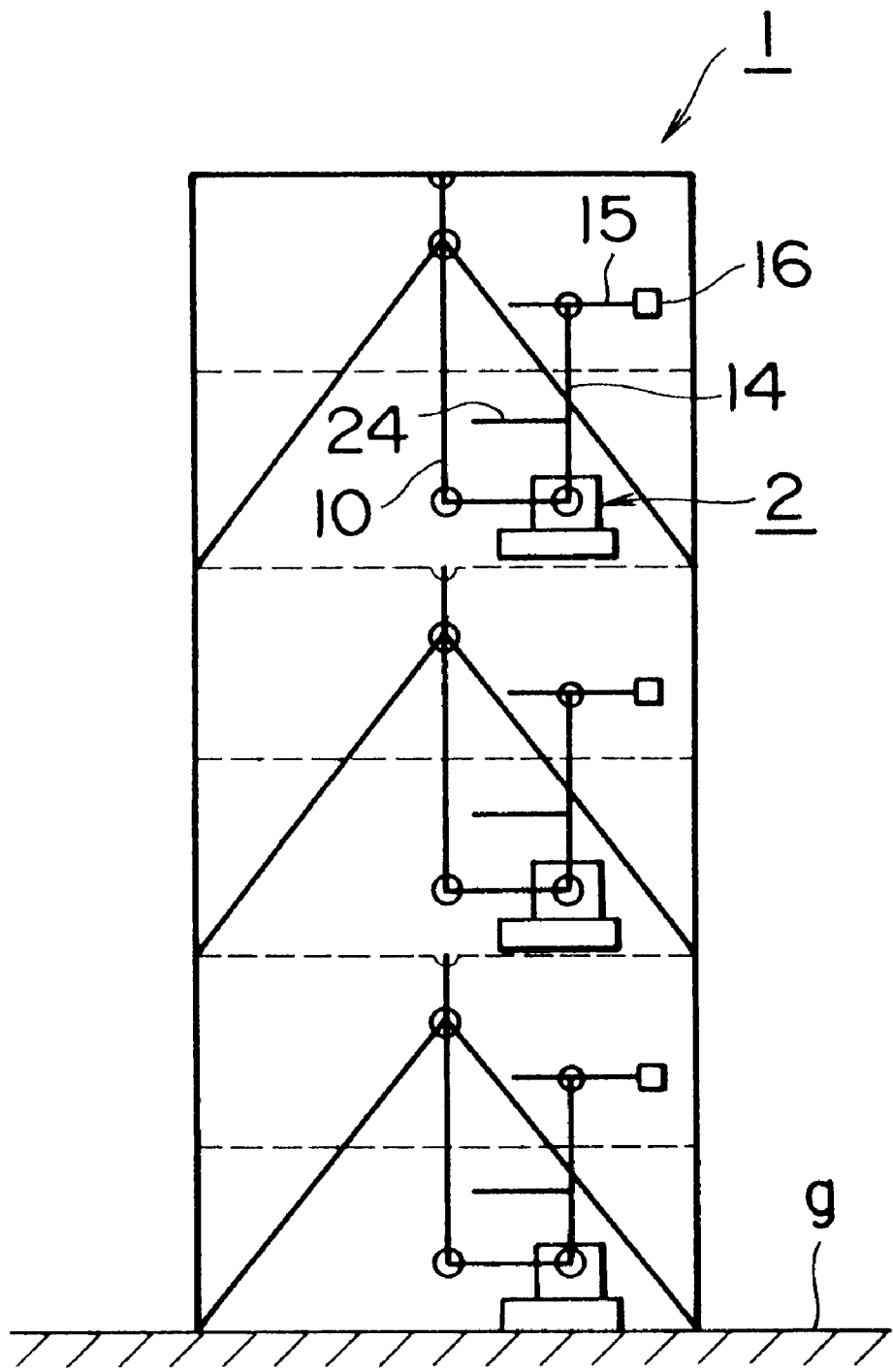
FIG. 5 is a view showing a configuration of a case where the lever-type frictional resistance force variable systems are disposed on every few stories of a structure.

Although FIG. 2 shows a case where the lever-type frictional resistance force variable system is disposed on every story of the structure 1 as described above, the invention is not limited to this configuration. As shown in FIG. 5, the lever-type frictional resistance force variable system may be disposed on every few stories (every two stories in the figure) of the structure 1 to reduce the number of systems. In this case as well, the effect equivalent to the above-described one can be achieved.

We claim:

1. A frictional resistance force variable system for a structure, said structure having at least two beams, said at least two beams relatively moveable when said structure is vibrated by an external force, said system comprising:

a bracket adapted to be fixed to one of said at least two beams and a supporting member adapted to be fixed to the other of said at least two beams an arm having two ends, one end is rotatably supported by said bracket;

said a supporting member rotatably supports an intermediate portion of said arm;

a braking device having frictional resistance plates connected to the other end of said arm in such a manner as to be capable of moving with the turning of the other end of said arm, friction pads provided along said frictional resistance plates, and a pressing portion provided in association with said frictional resistance plates and friction pads, said pressing portion pressing said friction pads and frictional resistance plates to generate a braking force;

a turning lever whose one end is connected to said pressing portion of said braking device to operate said pressing portion by turning; and driving means for turning said turning lever by driving the other end of said turning lever.

2. A frictional resistance force variable system according to claim 1, wherein said system has a sensor for detecting a displacement of one of said beams and a control unit for determining a braking force to be generated by said braking device based on the detected value of said sensor and outputting a control signal according to the determined braking force, said driving means has a ball screw threadedly engaging with said turning lever and a servomotor for rotating said ball screw, and the braking force generated by said braking device is adjusted by rotating said servomotor a predetermined amount to turn said turning lever a predetermined amount based on said control signal outputted from said control unit.

3. A frictional resistance force variable system according to claim 1, wherein said system is adapted to be disposed on every story or on every few stories of said structure.

4. A frictional resistance force variable system according to claim 2, wherein said system is adapted to be disposed on every story or on every few stories of said structure.

5. A frictional resistance force variable system for a structure, said structure having at least two beams, said at least two beams relatively moveable when said structure is vibrated by an external force, said system comprising:

a bracket adapted to be fixed to one of said at least two beams;

an arm having two ends, one end is rotatably supported by said bracket;

a supporting member adapted to be which is fixed to the other of said at least two beams and rotatably supports an intermediate portion of said arm;

a braking device having frictional resistance plates connected to the other end of said arm in such a manner as to be capable of moving with the turning of the other end of said arm, friction pads provided along said frictional resistance plates, and a pressing portion provided in association with said frictional resistance plates and friction pads, said pressing portion pressing said friction pads and frictional resistance plates to generate a braking force;

a turning lever whose one end is connected to said pressing portion of said braking device to operate said pressing portion by turning; and a servomotor for actuating said turning lever.

6. A frictional resistance force variable system according to claim 5, wherein said system has a sensor for detecting a displacement of one of said at least two beams and a control unit for determining a braking force to be generated by said braking device based on the detected value of said sensor and outputting a control signal according to the determined braking force, said turning lever has a ball screw threadedly engaging with said turning lever and a servomotor for rotating said ball screw, and the braking force generated by said braking device is adjusted by rotating said servomotor a predetermined amount to turn said turning lever a predetermined amount based on said control signal outputted from said control unit.

7. A frictional resistance force variable system according to claim 5, wherein said system is adapted to be disposed on every story or on every few stories of said structure.

8. A frictional resistance force variable system according to claim 6, wherein said system is adapted to be disposed on every story or on every few stories of said structure.

* * * * *